Nov. 27, 1951 — P. J. SUPER — 2,576,651
BEARING
Filed Sept. 26, 1947 — 3 Sheets-Sheet 1
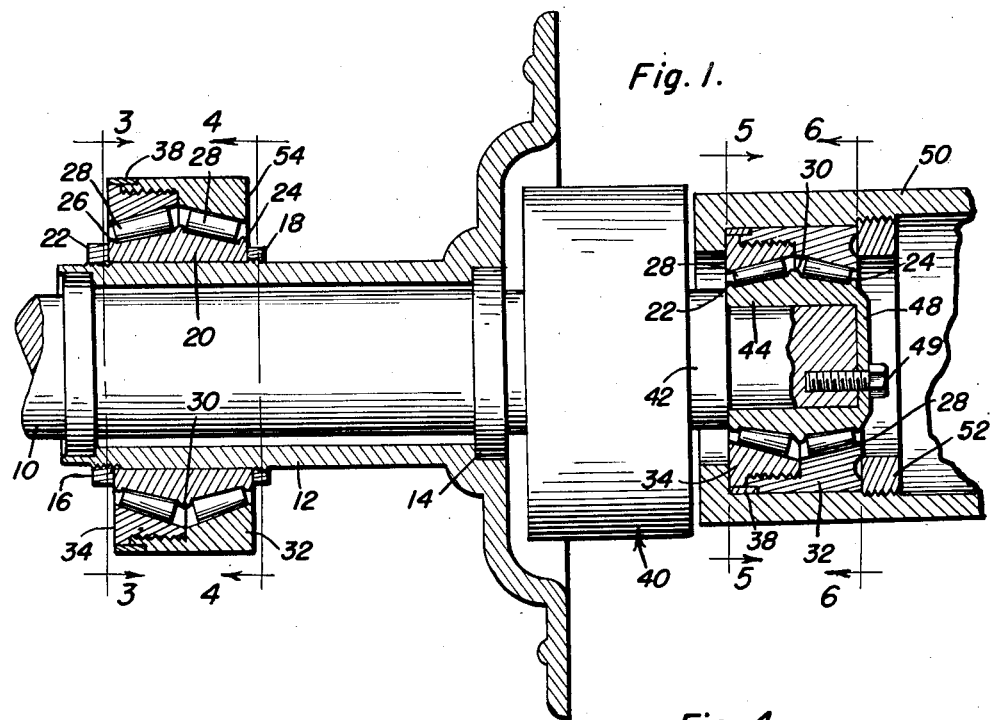
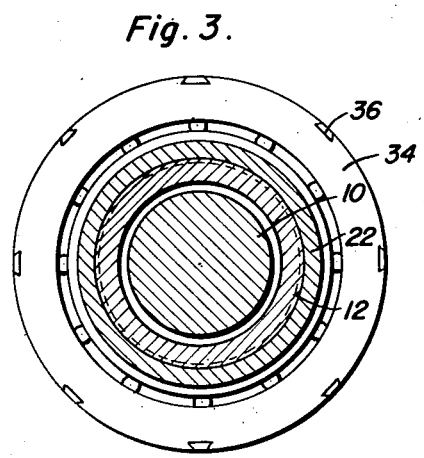
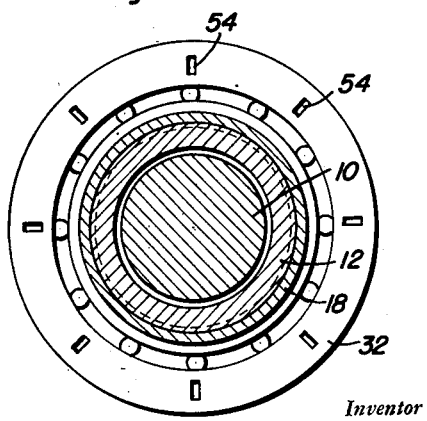
Inventor
Paul J. Super
By Clarence A. O'Brien
and Harvey B. Jacobson
Attorneys Nov. 27, 1951 P. J. SUPER 2,576,651
BEARING
Filed Sept. 26, 1947 3 Sheets-Sheet 2
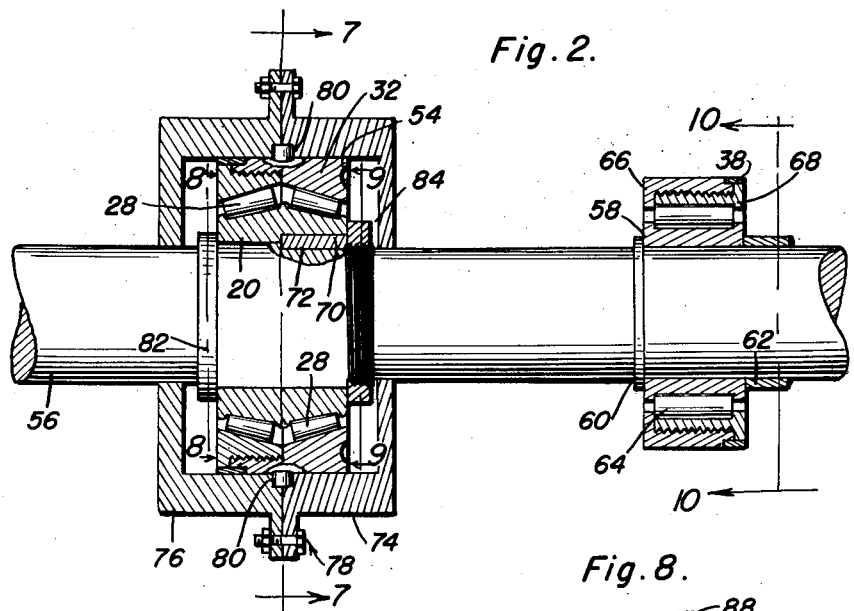
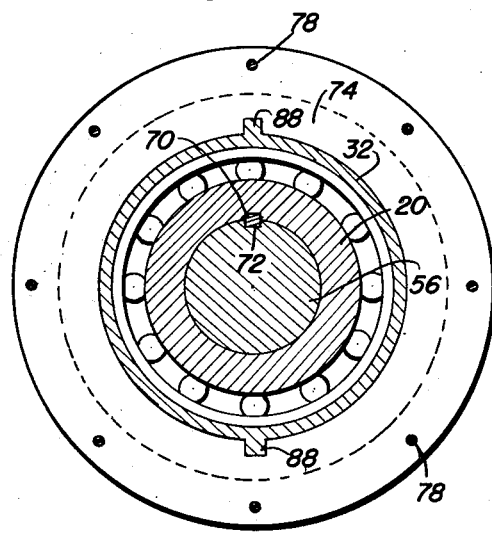
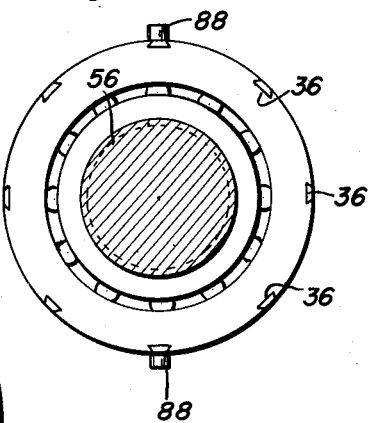
Inventor
Paul J. Super
By *Clarence A. O'Brien and Harvey B. Jacobson*
Attorneys Nov. 27, 1951 P. J. SUPER 2,576,651
BEARING
Filed Sept. 26, 1947 3 Sheets-Sheet 3

Inventor
Paul J. Super

By *Clarence A. O'Brien and Harvey B. Jacobson*
Attorneys

Patented Nov. 27, 1951

2,576,651

UNITED STATES PATENT OFFICE 2,576,651

BEARING

Paul J. Super, Dawson Creek, British Columbia, Canada, assignor of ten per cent to David E. Beaudoin, Muskwa, Canada; Henry Oliver Callahan, administrator of said Paul J. Super, deceased Application September 26, 1947, Serial No. 776,353

3 Claims. (Cl. 308—207)

This invention relates to novel and useful improvements in bearings and bearing assemblies and has for its principal purpose the provision of facility in assembly and adjustment, economy and feasibility.

Another purpose of this invention is to brace an inner race in such position, separated from a sectional outer race by means of roller means.

Another purpose of this invention is to provide locking means for holding the sections in a selected position relative to each other.

Another purpose of this invention is to provide an improved bearing construction of general utility which may be dismantled in order to replace a defective element, both easily and conveniently.

Other objects and features of novelty will become apparent to those skilled in the art, in following the description of the preferred embodiment of the present invention, illustrated in the accompanying drawings, wherein:

Figure 1 is a sectional view of the first form of the invention;

Figure 2 is a sectional view of the second form of the invention;

Figure 3 is a transverse sectional view taken on the line 3—3 of Figure 1 and in the direction of the arrows;

Figure 4 is another sectional view taken on the line 4—4 of Figure 1;

Figure 7 is a transverse sectional view of the invention shown in Figure 2 and taken substantially on the line 7—7 thereof and in the direction of the arrows;

Figure 8 is a sectional view of the invention shown in Figure 2, the outside housing being removed;

Referring now in detail to the illustrated preferred embodiment of the present invention, like reference characters are used throughout to indicate similar elements.

Figure 10:
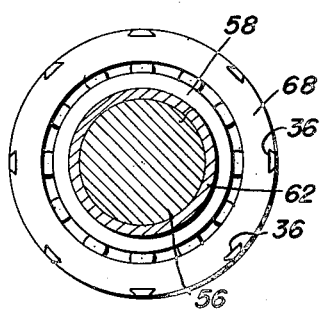
Figure 10 is a transverse sectional view of the invention shown in Figure 2 and taken substantially on the line 10—10 thereof and in the direction of the arrows.
Figure 9:
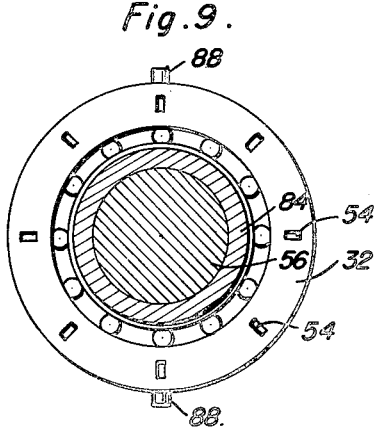
Figure 9 is a sectional view of the invention shown in Figure 2 and taken substantially on the line 9—9 thereof.
Figure 5:
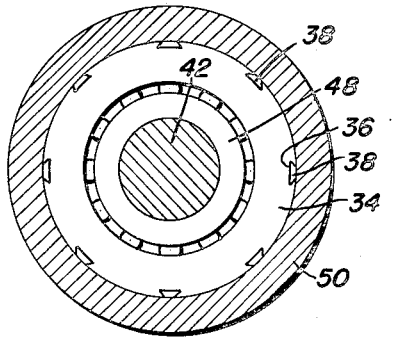
Figure 5 is a sectional view taken substantially on the line 5—5 of Figure 1.
Figure 6:
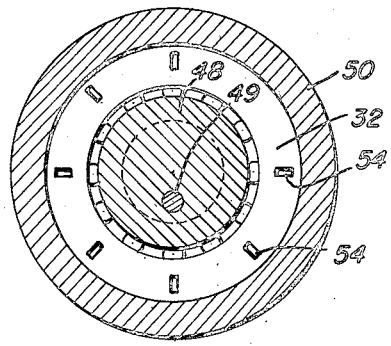
Figure 6 is another sectional view taken on the line 6—6 of Figure 1 and in the direction of the arrows.

This invention has been conceived and developed to provide improved bearing constructions which may be utilized in a multiplicity of environment and particularly in conjunction with machine elements which have bearings associated therewith, likely to have an element which might need replacement.

The general purpose of the invention has been set forth herein before however, it is noted that the preferential construction includes tapered roller bearings with seats appropriately designed therefor and an outer race composed of detachable sections. Now, the detachable sections also have associated therewith means for locking the said sections in the desired relative position. The said locking means is also readily detachable in order that any defective element may be readily removed and replaced.

Going to Figure 1 primarily it is noted that a shaft 10 is provided with a pair of bearing assemblies thereon. The first assembly consists of a housing 12 which may be rotatable relative to the shaft 10. An oil seal 14 may be supplied within the housing 12 and engageable with the said shaft. Of course, a backing nut 16 may be supplied at the terminal portion of the said housing 12 for the usual conventional purpose.

A collar 18 may be threadedly received on the said housing 12 for the purpose of engaging the side portion of an inner race 20. The opposite side of the said inner race 20 is also engaged by a threaded collar 22 thereby holding the said inner race 20 in the selected desired position.

Annular flanges 24 and 26 respectively are provided adjacent the side portion of the said inner race 20 and serve as limiting means for the roller bearings 28, positioned thereon. If desired, another annular flange 30 may be positioned between the said roller bearing 28, serving the purpose of a spacer.

It is noted at this point that the preferable construction is to provide tapered roller bearings for utility in this invention, however, ball bearings, straight rollers and the like may be utilized in lieu of the tapered bearings.

An outer race may be supplied for use in conjunction with this invention and is preferably composed of a pair of sections 32 and 34 respectively. The section 32 has a reduced portion with internal threads extending over the said section 34. Of course, the section 34 has complemental threads engageable with the said threads on the member 32. By this means, the two sections 32 and 34 respectively are threadedly and detachably secured together. A plurality of dovetail slots 36 are supplied in the periphery of the section 34 and also the section 32. Dovetail pins 38 are adapted to be positioned in aligned slots 36. Of course, this serves the purpose of locking the two sections 32 and 34 in a selected position.

A coupling or the like 40 is supplied in conjunction with the shaft 10 and may be any suitable machine element. In fact, the element 40 merely designates a conventional element for the purpose of setting forth the environment in which the improved roller bearing construction may be utilized.

Positioned on the shaft 10, which may be an extension of the previously mentioned shaft or, if desired an entirely different shaft 42, is a second improved roller bearing construction. Now, the utility of the shaft 42 depends entirely upon the environment and machine element which is generally indicated at 40. An inner race 44 is supplied with the usual annular shoulders 24, 22 and 30 for the purpose of seating the roller bearings 28. In this instance it is noted that the terminal portion of the shaft 42 is utilized therefor, a disc 48 extends over the end of the said shaft. An aperture is provided in the said disc and an offcenter bolt 49 retains the said disc immovable relative to the said shaft. This bolt of course extends within a suitable threaded aperture within the shaft 42. A housing 50 is supplied around the shaft 42 and also around the inner and outer races.

This housing 50 has a limiting collar 52 threadedly received therein which abuts the outer race of the bearing assembly. This outer race is composed of elements 32 and 34 respectively, identical to those described above. Of course, the dovetail pins 38 are also utilized therewith for the same purpose as described above. Obviously, this bearing assembly and construction is also easily dismantled as described above. It is further noted at this point that the outer races of the said bearing construction may be supplied with apertures 54 which are engageable by a spanner wrench for the obvious assembly and disassembly purposes. This type of aperture may be supplied for this purpose wherever desirable throughout the construction.

Going now to the second embodiment of the invention reference is made primarily to Figure 2 wherein a shaft 56 is supplied with an inner race 58 engageable therewith. Limiting collars 60 and 62 respectively are fixed to the said shaft or if desired may be rotatable relative thereto, which are engageable with the inner race 58. This construction obviates movement of the said inner race axially of the shaft 56. Roller bearings or the like 54 may be supplied in the inner race and the outer race composed similar to the outer races described in connection with the first embodiment of the invention. A first section 66 having an annular collar extending therefrom, is supplied. Within this collar, there are internal threads engageable with external threads of the second bearing section 68. Then of course, the dovetail pins 38 are fixed within the construction for the purpose of obviating relative movement of the two sections when desired.

A second bearing construction is supplied on the said shaft 56. A square key 70 is detachably received in a suitable keyway 72 in the shaft 56 and inner race 20. A multi-sectional housing is supplied over the said shaft at a selected position. This multi-sectional housing is preferably composed of two elements 74 and 76 respectively which are detachably secured together by means of a conventional bolt and nut construction 78 engageable in suitable peripherial flanges on each of the said elements. Diametric apertures 80 are supplied in the said sectional housing for a purpose to be described later. A collar 82 is supplied on the shaft 56 and within the said housing. This collar engages an inner race 20 identical to that described in connection with the first embodiment of this invention.

A limiting collar 84 is supplied on the shaft 56 by utility of threaded connections. This limiting collar 84 engages the said inner bearing race 20 for firm retention thereof. Of course, the tapered roller bearings 28 are utilized herewith as described above and the substantially identical outer race members are also utilized. Positioned on the member 32 however, there is a pair of diametrically opposite lugs 88 engageable with the said apertures 80 in the housing. Obviously, by this construction the outer race is held immovable relative to the housing.

While there has been described and illustrated but preferred embodiments of the invention it is apparent that various departures may be made therefrom without departing from the spirit of the invention. Accordingly, limitation is sought only in accordance with the scope of the following claims.

Having described the invention, what is claimed as new is:

1. An anti-friction bearing construction comprising an inner race, means for fixing said inner race to a shaft, an outer race having sections, means for locking said sections in fixed position, roller means interposed between said races, a housing, adjustable means secured to the housing for securing said housing to the outer race, said section locking means including dovetail slots in said sections, complemental pins in said slots and threaded connections between said sections.

2. An anti-friction bearing construction comprising an inner race having a plate at one end thereof, means for securing said plate to the end of a shaft, said means being eccentrically arranged with respect to the shaft, an outer race including threadedly connected sections disposed around said inner race, rollers disposed between said races, means disposed in said sections for preventing rotative movement of said sections with respect to each other, a housing disposed around said outer race, a shoulder at one end of said housing in abutment with said outer race, and means threadedly disposed in said housing and engaging said outer race urging said outer race against said shoulder.

3. In an anti-friction bearing construction, an inner race, means for fixing said inner race to a shaft, rollers disposed on said inner race, an outer race disposed on said rollers, said outer race including sections threadedly connected together, dovetail slots in said sections and dovetail pins disposed therein to prevent rotative movement of said sections with respect to each other, a housing having said outer race fitted snugly therein, an externally threaded member carried by said housing and engaging said outer race retaining said outer race in said housing, and a shoulder fixed to said housing and spaced from said threaded member forming an abutment for said outer race.

PAUL J. SUPER.

REFERENCES CITED

The following references are of record in the file of this patent:

UNITED STATES PATENTS

| Number | Name | Date |
|---|---|---|
| 904,343 | Makutchan | Nov. 17, 1908 |
| 1,158,817 | Lockwood | Nov. 2, 1915 |

FOREIGN PATENTS

| Number | Country | Date |
|---|---|---|
| 468,263 | Germany | Nov. 10, 1928 |
| 668,036 | Germany | Nov. 25, 1938 |